United States Patent
Christel et al.

(10) Patent No.: US 7,819,942 B2
(45) Date of Patent: Oct. 26, 2010

(54) SOLID-PHASE POLYCONDENSATION OF POLYESTER WITH PROCESS GAS PURIFICATION

(75) Inventors: Andreas Christel, Zuzwil (CH); Claudemiro Ferreira, Pocos de Caldes (BR)

(73) Assignee: Buhler AG, Uzwil (CH)

( * ) Notice: Subject to any disclaimer, the term of this patent is extended or adjusted under 35 U.S.C. 154(b) by 112 days.

(21) Appl. No.: 11/660,776

(22) PCT Filed: Aug. 22, 2005

(86) PCT No.: PCT/CH2005/000488
§ 371 (c)(1),
(2), (4) Date: Feb. 21, 2007

(87) PCT Pub. No.: WO2006/021117

PCT Pub. Date: Mar. 2, 2006

(65) Prior Publication Data
US 2007/0255036 A1 Nov. 1, 2007

(30) Foreign Application Priority Data
Aug. 25, 2004 (DE) .................. 10 2004 041 370

(51) Int. Cl.
B01D 47/00 (2006.01)

(52) U.S. Cl. .............. 95/37; 95/92; 95/94; 95/117; 95/149; 95/204; 96/290; 96/300; 521/48; 528/271; 528/272; 528/308.2; 528/501; 422/131; 422/139; 422/190

(58) Field of Classification Search .............. 528/272, 528/274, 271, 308.2, 480, 501, 502 R; 521/48.5, 521/48; 422/139, 131, 190; 95/211, 224, 95/36, 37, 90, 92, 94, 117, 149, 204; 96/290, 96/300; 526/348, 317.1; 525/240
See application file for complete search history.

(56) References Cited
U.S. PATENT DOCUMENTS 4,064,112 A * 12/1977 Rothe et al. .............. 528/272
5,738,835 A   4/1998 Brueck
5,773,555 A * 6/1998 Weger et al. .............. 528/310
6,048,957 A   4/2000 Ekart
6,548,031 B1  4/2003 Ferreira
2004/0192878 A1* 9/2004 Borer et al. ............... 528/272

FOREIGN PATENT DOCUMENTS

| EP | 0 660 746 B1 | 7/1995 |
| EP | 0 836 921 | 4/1996 |
| EP | 0 717 061 | 6/1996 |
| WO | WO99/20371 | 4/1999 |
| WO | WO 02068498 | * 9/2002 |

OTHER PUBLICATIONS

Chemisches Recycling von Pollyethylenterephthalat und Polymethylmethacrylat, Jan. 1, 2003, Guido Grause.
The Concise Polytechnical Dictionary, M, 1956, p. 653, article "Purification of flue gases".

* cited by examiner

Primary Examiner—Ling-Siu Choi
Assistant Examiner—Frances Tischler
(74) Attorney, Agent, or Firm—Francis C. Hand; Carella, Byrne, Cecchi

(57) ABSTRACT

The invention relates to a method for producing a high-molecular polyester from a solidified polyester prepolymer by solid phase polycondensation. The polycondensation cleavage products of the solid phase polycondensation reaction are extracted from the product by means of a process gas, and the process gas is then cleaned and essentially recycled. According to the invention, the process gas is cleaned by means of an aqueous washing liquid. The invention also relates to an installation for carrying out the inventive method, said installation containing a crystallisation appliance (1) and a reaction appliance (2). A gas outlet (2d) of the reaction appliance (2) is directly or indirectly connected to a gas inlet (3c) in a gas cleaning system (3), and a gas outlet (3d) of the gas cleaning system (3) is connected to a gas inlet (2c) of the reaction appliance (2). Furthermore, the gas cleaning system (3) comprises a gas washing appliance to which an aqueous washing liquid is supplied, and a gas drying appliance (4) which is mounted downstream.

20 Claims, 1 Drawing Sheet

SOLID-PHASE POLYCONDENSATION OF POLYESTER WITH PROCESS GAS PURIFICATION

Figure 1:
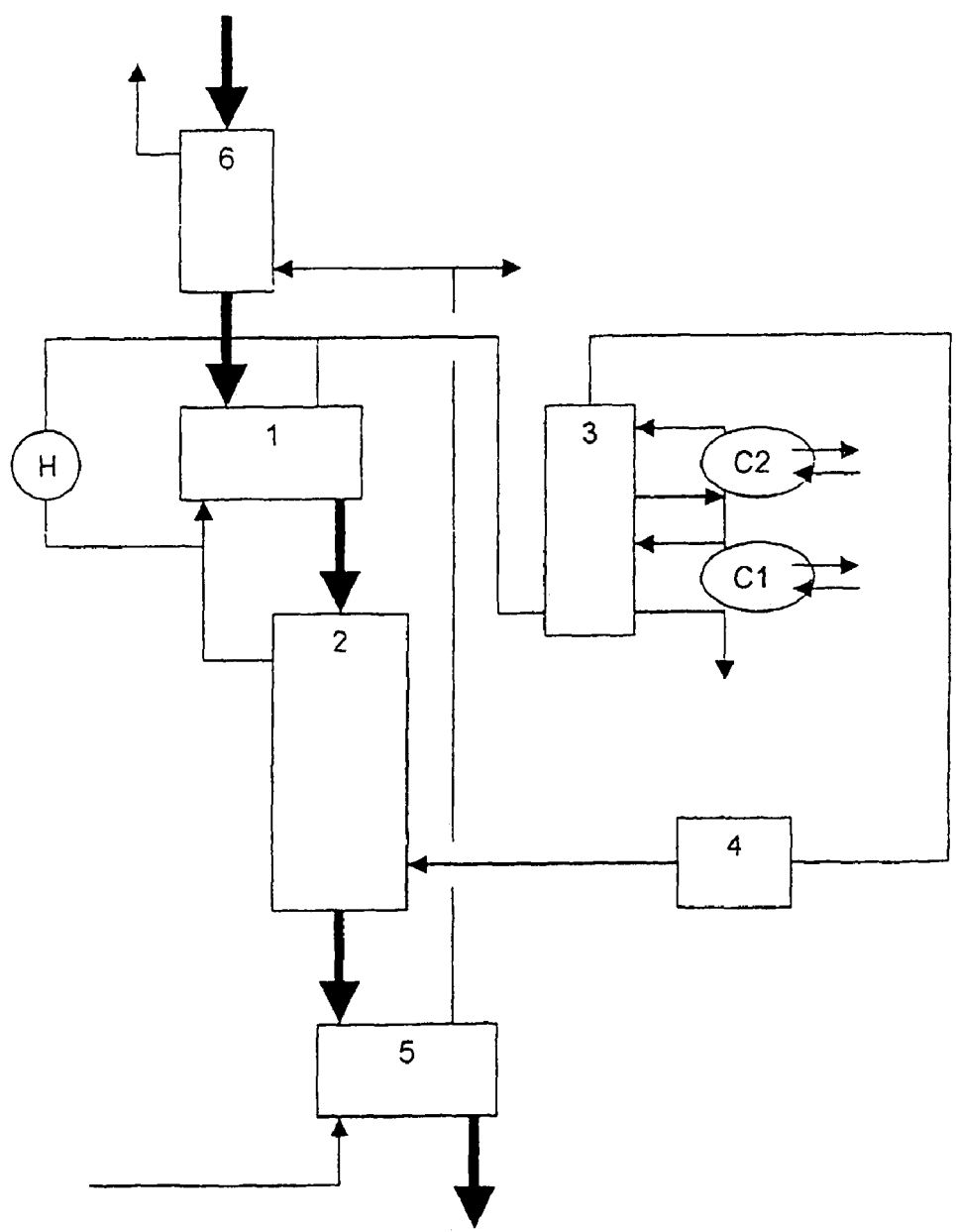

The invention relates to a method for manufacturing a high-molecular polyester out of a solidified polyester prepolymer via solid-phase polycondensation, wherein the polycondensation cleavage products from the solid-phase polycondensation reaction are removed from the product by means of a process gas, and the process gas is subsequently purified to remove the polycondensation cleavage products and essentially recycled.

The invention also relates to a device for manufacturing a high-molecular polyester with a crystallization unit and reaction unit.

Methods for manufacturing high-molecular polycondensates in a solid-phase polycondensation step are known in the art.

Usually, a process gas is here at least partially circulated. This process gas must here be subjected to at least partial purification. These purifications are known, for example, from EP 1100611, where purification takes place via catalytic combustion. The disadvantage encountered here involves the relatively high combustion temperatures that must be achieved to achieve complete combustion. This is especially problematical when processing polyesters loaded with foreign substances.

Also known are gas purification systems where use is made of a gas scrubber that utilizes an organic fluid as the washing liquid, which is subsequently reprocessed and consumed in a preceding step in the polyester manufacturing process (liquid-phase condensation step). For example, ethylene glycol is used as the washing liquid for polyethyleneterephthalate manufacture. The disadvantage to this method is that the liquid-phase condensation phase step and solid-phase condensation step and the solid-phase polycondensation step must be interlinked.

The object of this invention is to provide a method for the solid-phase polycondensation of polyesters that can be implemented with improved energy efficiency and independently of any potential application for an organic washing liquid.

Briefly, the invention provides a method for manufacturing a high-molecular polyester out of a solidified polyester prepolymer via solid-phase polycondensation, wherein polycondensation cleavage products from a solid-phase polycondensation reaction are removed from the product by means of a process gas, and the process gas is subsequently purified to remove the polycondensation cleavage products and essentially recycled. The method is characterized in that the process gas is purified by means of an aqueous washing liquid.

The invention also provides an apparatus for manufacturing a high-molecular polyester that includes at least one crystallization device and a reaction device wherein each device has product inlet openings, product outlet openings, gas inlet openings and gas outlet openings. The apparatus is characterized in that a gas outlet opening of the reaction device is connected with a gas inlet opening in a gas purification system and a gas outlet opening from the gas purification system is connected with a gas inlet opening of the reaction device. In addition, the gas purification system has a gas scrubber, which receives an aqueous washing liquid as well as a downstream gas dryer.

According to the invention, the process gas is purified using a gas scrubber operated with an aqueous washing liquid.

Advantageous embodiments of the method according to the invention and the device according to the invention are described in the subclaims.

Polyester

Polyester is a crystallizable, thermoplastic polyester, such as polyethyleneterephthalate (PET), polybutyleneterephthalate (PBT) and polyethylenenapphthalate (PEN), which is present either as a homopolymer or copolymer, and obtained via a polycondensation from its monomers, diol component and a dicarbonic acid component, accompanied by the cleavage of a low-molecular reaction product. Various, mostly linear or cyclic diol components are used. Various mostly aromatic dicarbonic acid components can also be used. The dicarbonic acid can also be replaced by its corresponding dimethylester. Polycondensation can here take place directly between the monomers or by way of an intermediate stage, which is subsequently replaced by transesterification, wherein transesterification can again take place with the cleavage of a low-molecular reaction product or via ring opening polymerization. The polyester obtained in this manner is essentially linear, wherein a slight number of branches can form.

The polyester can be a new material, recyclate or a mixture of new material and recyclate.

Additives can be incorporated into the polyester. Suitable additives include catalysts, dyes and pigments, UV blockers, processing aids, stabilizers, impact modifiers, chemical and physical types of foaming agents, fillers such as nucleating agents, barriers or particles that improve mechanical properties, reinforcing bodies, such as balls or fibers, as well as reactive substances, such as oxygen absorbers, acetaldehyde absorbers or molecular weight-increasing substances, etc.

Polyethyleneterephthalate

Polyethyleneterephthalate is a crystallizable, thermoplastic polyester obtained in a polycondensation reaction accompanied by the cleavage of low-molecular reaction products. Polycondensation can here take place directly between the monomers, or by way of an intermediate stage, which is subsequently replaced by transesterification, wherein transesterification can again take place with the cleavage of a low-molecular reaction product. The polyester obtained in this manner is essentially linear, wherein a slight number of branches can form.

Polyethyleneterephthalate is obtained from a monomer, a diol component and a dicarbonic acid component, wherein the diol components largely consist of ethylene glycol (1,2 ethane diol), and the dicarbonic acid components largely consist of terephthalic acid. Other linear, cyclic or aromatic diol and dicarbonic acid compounds are possible as the comonomers. Typical comonomers include diethylene glycol (DEG), isophthalic acid (IPA) or 1.4-bis-hydroxymethylcyclohexane (CHDM).

Polyester Prepolymer

Polyester prepolymers are polymerized or polycondensed into a prepolymer in a first step in the liquid phase. The polyester prepolymer melt obtained in this manner is usually manufactured in a continuous process.

An esterification step initially takes place here, and then a prepolycondensation step. In the conventional polyester manufacturing process, a polycondensation step follows in the high-viscosity reactor (also called finisher). (For example, see: Modern Polyesters, Wiley Series in Polymer Science, Edited by John Scheirs, J. Wiley & Sons Ltd., 2003; Ch. 4.2). Polyester production can also take place in a batch process (for example, see: Modern Polyesters, Wiley Series in Polymer Science, Edited by John Scheirs, J. Wiley & Sons Ltd., 2003: Ch. 4.1).

As an alternative, the polycondensation step in the high viscosity reactor can be omitted. This yields a low-viscous polyester prepolymer with a polymerization level (DP) lying distinctly under the polymerization level of the polyester after the ensuing solid phase treatment. The polymerization level of the low-viscous prepolymer usually measures below 60%, in particular 50%, of the polymerization level of the polyester post-condensed in the solid phase.

Another alternative is to use already polycondensed polyesters, which in their raw form are present in the form of bottle scraps, or in a homogenized form due to melting. In like manner, an already polycondensed polyester can be brought to a suitable viscosity level via melting and depolymerization.

Granulation

The polyester prepolymer melt is usually solidified through granulation, even though alternative solidification methods can also be used to generate solid prepolymer particles, such as sintering threads, cutting film or milling cooled pieces.

During granulation, the prepolymer melt is transferred into a defined mold and solidified. The prepolymer melt is here pressed through a die with an opening or plurality of openings, and cut or dripped.

The die openings are usually round, but can also have another profile, e.g., slit openings. Cutting can take place both directly at the die outlet, or after first traversing a treatment passage.

Cooling solidifies the prepolymer melt. This can take place using a liquid cooling medium (e.g., water, ethylene glycol) or a gaseous cooling medium (e.g., air, nitrogen, water vapor), or through contact with a cold surface, wherein a combination of cooling media is also conceivable.

Cooling can take place both simultaneously with, or before or after particle molding.

Given a prepolymer melt from a conventional polyester manufacturing process, use is normally made of granulation processes such as strand granulation, water ring granulation, underwater granulation or head granulation (also called hot face granulation).

Given a low-viscous prepolymer melt, use is normally made of granulation processes such as dripping, water ring granulation underwater granulation or head granulation (also called hot face-granulation).

The average granulate size usually ranges from 0.4 mm to 10 mm, preferably from 0.7 mm and 3 mm. The statistical mean for the average granulate diameter derived from averaging the granulate height, length and width applies as the average granulate size.

The granulates can have a defined granulate shape, e.g., be cylindrical, spherical, drop-like, and ball-like, or have a designer shape, e.g., of the king proposed in EP 0541 674, or exhibit a non-uniform, grainy product shape, which arises from a milling or breaking process.

Use can be made of solid granulates or porous granulates, e.g., obtained via sintering, foaming and the like.

Solid-phase Polycondensation

The term solid-phase polycondensation is used to summarize all procedural steps necessary to manufacture a high-molecular polyester out of the solidified prepolycondensate in a solid phase. These include steps for heating, crystallizing, reacting and cooling. Additional processing steps, e.g., treatment with additives, can be included.

The procedural steps take place in the respective devices suitable for the step. However, several procedural steps can be implemented in a single device simultaneously or in several stages. In like manner, several devices can be used for a procedural step.

The individual devices are here interconnected by down pipes or conveying lines. Transfer canals can be located between the individual devices, e.g., cell wheel transfer canals or alternating straddle packers.

According to the invention, the polyester prepolymer is supplied to the process "cold", e.g., in the form present after stored in a silo, container or small packing drum. This means that it is not sent to the process retaining a significant portion of the heat content from a preceding procedural step. Therefore, the polycondensate prepolymer is routed to the process at an ambient temperature of under 40° C., in particular of between −20 and 25° C.

During solid-phase polycondensation, the product temperature is increased by at least 160° C., in particular by at least 180° C., which elevates the product temperature to at least 185° C., in particular at least 205° C.

Since the energy efficiency of a process can be increased with rising throughput, throughputs of between 100 and 800 tons per day are common, wherein even higher throughputs, or even smaller throughputs ranging from 10 to 100 tons can be encountered for special applications, such as technical fibers or recycling operations.

Despite the energy advantages that accrue when all procedural steps are arranged one on top of the other and the product is transferred from one procedural step to the next via gravitation, it is advantageous in particular in systems with high throughput rates that the polycondensate be elevated by a conveyor to a higher level at least once during the process to limit the overall height of the system.

Crystallization

The crystallization level of the prepolymer granulates is increased according to methods known in the art. Crystallization usually takes place thermally, which yields a thermally partially crystallized polyester. Solvent-induced crystallization and crystallization through mechanical stretching are also conceivable, but less suitable.

Crystallization can take place in several stages, i.e., before, during and after the granulation step. To this end, the prepolymer granulates must be treated at a suitable crystallization temperature.

Crystallization must result in at least one crystallization level that permits treatment during subsequent solid-phase polycondensation, without any conglutination or clump formation occurring there.

The suitable temperature range becomes evident when recording the crystallization half-life period ($t_{1/2}$) measured in the DSC as a function of temperature. It is limited top and bottom by y the temperature at which the crystallization half-life period reaches roughly 10 times the minimum crystallization half-life period. Since very short crystallization half-life periods ($t_{1/2}$) are difficult to determine, $t_{1/2}=1$ minute is used as the minimum value.

In the case of polyethyleneterephthalate, the temperature ranges between 100 and 220° C., and a crystallization level of at least 20%, preferably of at least 30%, is reached.

According to the invention, the temperature of the prepolymer granulates after the granulation step lies below the suitable crystallization temperature. As a result, the prepolymer granulates must be heated. For example, this can be done using a heated wall of the crystallization reactor, heated built-in units in the crystallization reactor, or radiation, or by injecting a hot process gas.

The suitable crystallization time is found from the time required to heat the product to the crystallization point plus at least the crystallization half-life period at the given temperature, wherein 2-20 half-life periods are most preferably added to the heating time in order to achieve sufficient crystallization.

To prevent the crystallizing prepolymer granulates from conglutinating, they should be kept in motion relative to each other. For example, this can be accomplished using an agitator, a moving container or through exposure to a fluidization gas.

Particularly suitable crystallization reactors include fixed-bed or fluidized bed crystallizers, since these tend not to generate dust.

At the same time that the crystallization level is increased, any residual liquid from the granulation process is also removed.

If a process gas is circulated in the crystallization process, it must receive enough fresh gas or purified process gas to prevent excessive enrichment of the liquid. The process gases used for solid-phase polycondensation can also be used in the crystallization step, wherein varying process gases can also be used in the varying procedural steps.

In one embodiment of this invention, the polycondensate is heated prior to crystallization, which is done using a process gas stream from a step in the further course of solid-phase polycondensation.

A process gas stream from a step for cooling the polycondensate is particularly suitable for this purpose. Especially preferred is a process gas stream from a step that takes place in air.

The polycondensate is to be heated to a temperature Tv greater than 50° C., in particular greater than 75° C., wherein Tv most preferably ranges from Tg–30° C. to Tg+30° C., in particular from Tg to Tg+20° C., wherein Tg denotes the glass transition temperature of the polycondensate.

Heating can take place in any reactor desired. Preference goes to a device in which the product is moved, for example an agitated or moving reactor, a fixed-bed or fluidized-bed unit.

Especially preferred is a device that can be operated at varying gas throughput amounts and an mg/mp ratio of >2, which makes it possible to regulate the product outlet temperature from the heating step, even given fluctuations in the process gas stream temperature, from a step during the further progression of solid-phase polycondensation via the gas flow quantity.

Heating preferably takes place at an average retention time of within a few minutes to at most one hour, but can also occur in a storage tank for a longer retention time, if Tv does not exceed one hour, in particular 20 minutes.

Polycondensate heating is simultaneously accompanied by a drying of the polyester, if it still is reacting with moisture or another volatile substance.

This makes it possible to reduce volatile substances in subsequent procedural steps, thereby reducing the contamination level of the accompanying process gas streams, and hence diminishing the gas quantity that has to be purified. In particular, a polycondensate moist owing to granulation is dried. To this end, the process gas quantity and temperature are selected in such a way as to dry the polycondensate to a moisture content of between 50 ppm water and 2000 ppm water, in particular of between 200 ppm water and 1000 ppm water.

Solid-Phase Polycondensation Reaction

The molecular weight of the polyester granulates is brought to a higher polymerization level in a solid-phase polycondensation reaction with the cleavage of polycondensation cleavage products.

If a granulate from a prepolymer melt obtained from a conventional manufacturing process is present, the polymerization level is normally raised by between 10% and 70%, wherein an increase of at least 0.10 dl/g is preferred.

If a granulate from a low-viscous prepolymer melt is present, the polymerization level is raised to about 1.5 times, in particular at least 2 times the prepolymer The solid-phase polycondensation reaction takes place according to methods known in the art, initially occurring at a suitable post-condensation temperature at least during the heating step, and during a step in the post-condensation reaction. Essentially continuous processes are used here, e.g., those taking place in devices such as fixed-bed, solids-air jet or fluidized bed reactors, and in reactors with agitating implements or reactors that move, such as rotary furnaces. The solid-phase polycondensation reaction can take pace at either a normal pressure, an elevated pressure or under a vacuum.

According to the invention, the polycondensation cleavage products from the solid-phase polycondensation reaction are removed by means of a process gas (carrier gas). In continuous processes with process gas, the process gas here flows around the polycondensate co-currently, counter-currently or cross-currently. The carrier gas quantity must be sufficient to discharge reaction products that diffuse on the surface of the particles along with any contaminants, such as carbonyl compounds from the manufacturing process or contaminants from prior use from the reaction step.

If the heating step takes place through exposure to a process gas, a high specific gas quantity (mg/mp=2 to 20, in particular 5 to 13) is used, as a result of which the product temperature essentially approximates the gas temperature.

If the heating step takes place through other energy supply means, e.g., via a heated surface, or radiation, it still is advantageous to pass a process gas through the product or apply a vacuum.

The post-condensation reaction step can take place at a low specific gas quantity (mg/mp=0.1-1.5, in particular 0.3-1.0), as a result of which the gas temperature essentially approximates the product temperature, making it possible to supply the process gas to the process at a temperature lying under the post-condensation temperature.

In this case, mp is the sum of the mass of all product streams supplied to the process, while mg is the sum of the mass of all gas streams supplied to the process.

The process gases are circulated by means of a gas compressor, e.g., fans, ventilators or compressors. The process gas can be air or inert gases, such as nitrogen or $CO_2$, as well as mixtures of process gases. The inert gases should most preferably contain less than 100 ppm, in particular less than 10 ppm, of oxygen, wherein higher oxygen quantities are conceivable if the treatment temperature during the process is sufficiently low, or it is possible to remove oxygen from the process, e.g., via combustion. The process gases can contain additives, which either act reactively on the product to be treated, or become passively deposited onto the product to be treated.

According to the invention, the process gas is at least partially circulated.

In order not to impede the polycondensation reaction, the process gas is purified to remove undesired products, in particular cleavage products from the polycondensation reactions. Cleavage products like water, ethylene glycol, methyldioxolane or aldehydes (e.g., acetaldehyde) are here to be reduced to values under 100 ppm, in particular to values under 10 ppm. To achieve equilibrium, it may be necessary to leave a residual quantity of reaction products in the process gas. At the same time, other undesired products, e.g., contaminants transferred from the polyester to the process gas, are removed during purification.

According to the invention, purification involves the use of gas scrubbing systems known in the art, wherein other purification stages, such as filters, demisters (drop separators), adsorption systems or cold traps, can be used. The gas scrubbing system is operated with an aqueous washing liquid, wherein other substances can be added to the water, e.g., surfactants, neutralization agents or solvents. The scrubbing system can be operated in one or more stages using a shared washing liquid or different washing liquids. The gas can here flow co-currently or counter-currently relative to the washing liquid. In this case, the washing liquid can only be used one time in an open system, circulated in a single loop in a half-open or closed system, or circulated in several, independent or coupled loops. To improve the exchange between gas and washing liquid, packing sufficiently known in prior art can be used. The washing liquids are most preferably at least partially circulated. Other components such as pumps, overflow containers or coolers can be used in the circulation system.

A system for separating out entrained droplets (mists), e.g., a demister (drop separator) can be placed downstream to the scrubbing system.

In order to further lower the dew point of the process gas exiting the scrubbing process, use can be made of a dryer, e.g., an adsorption dryer.

It is advantageous to cool the process gas down to a temperature under 15° C., in particular under 10° C., before entry into an adsorption dryer. This can be accomplished either through the use of cooled washing liquids, or by way of a separate cooling device, e.g., a cold trap.

The adsorption dryer adsorbs water and any volatile organic components that were not dissolved from the washing liquid, e.g., acetaldehyde or formaldehyde. A parallel configuration of adsorption beds is most preferably selected, so that a bed can be regenerated while the other is in use. During regeneration, water and the organic components are again desorbed, e.g., by means of a regeneration gas. Regeneration can take place either in an open circulatory system by releasing the regeneration gas, or in a closed circulatory system. A combination is also conceivable. If a closed regeneration circulatory system is used, the desorbed substances must be removed from circulation. This is done primarily for water via condensation. The organic components either also condense to a sufficient extent, or must be separately removed, e.g., via combustion or, in a combined system, by releasing regeneration gas.

To remove oxygen, a combustion device, e.g., a catalytic combustion device, can be provided, in which the oxygen is burned along with a controlled, metered quantity of combustible substances.

In one special embodiment of this invention, the washing liquid is subsequently used in a procedural step to prepare spent polyester, e.g., polyester bottle scraps.

The suitable post-condensation temperature ranges from 185° C. to 240° C., wherein temperatures of between 190 and 220° C. are preferred.

The suitable post-condensation time ranges from 2 to 100 hours, wherein retention times of 6 to 30 hours are preferred for economic reasons.

As an option, the crystallization step and heating step can take place simultaneously or at least in the same reactor at a suitable post-condensation temperature, wherein the reactor used for this purpose can be divided into several process chambers, in which varying process conditions can prevail (e.g., temperature and retention time).

Specific Energy Input

The specific energy input is the sum of all thermal and mechanical energy supplied to the process relative to the processed product quantity. Limits to the process extend from the product entry into the process before the first processing step to the product exit from the process after the last processing step, wherein the product enters the process at an ambient temperature, i.e., a maximum of 40° C., usually 0 to 25° C. Any step for preheating the product is hence integral to the process. The process includes all procedural steps in which the product is treated. The process also includes all gas streams or liquid streams that are used for the direct or indirect energy input to the product.

Therefore, the process includes procedural steps in which the product is heated, crystallized, blended, treated with carrier gas or under a vacuum cooled, moved, mixed or conveyed.

Therefore, a procedural step in which the product is heated by a hot surface includes the energy required to heat the surface. If the surface is heated by means of a fluid, energy inputs for agitating the fluid and heating the fluid are taken into account.

Therefore, a procedural step in which the product is treated via radiation, in particular heated, includes the energy required to generate the radiation, e.g., microwave radiation or infrared radiation.

Therefore, a procedural step in which the product is moved includes the energy used to move the product, e.g., drives for agitators, transfer canals or screw conveyors, or drives for moving a treatment device or part of a treatment device, e.g., rotary kilns or vibrating screens.

Also taken into account are energy inputs for circulation and any heating of a fluid used to move the product, e.g., process gases used in fixed-bed or solids-air jet bed devices or in pneumatic conveyors.

Therefore, a procedural step in which the product is treated by means of a fluid, e.g., a process gas, includes the energy carriers required to circulate and, when necessary, heat the fluid. If the fluid is circulated or at least partially circulated, energy inputs required to clean the fluid are taken into account.

Energy inputs required to clean the fluid include energy inputs needed to circulate a washing liquid, regenerate an adsorption device or operate a combustion unit.

Energy inputs for generating and circulating the energy carrier (=utilities) are not taken into account if not directly released to the product.

Energy carriers include electrical current, cooling water, compressed air, heat carriers like vapor, or heat carrier oils or process gas like nitrogen, $CO_2$ or special gas mixtures.

Not taken into account:
Energy inputs for circulating of cooling water or ice water used to indirectly cool a process gas stream;
Energy inputs for generating cooling water or ice water;
Energy inputs for generating compressed air for process control;
Energy inputs for generating nitrogen or other process gases;
Energy inputs for circulating heat carriers used to indirectly heat a process gas stream
Energy inputs for generating and distributing electrical current Also not taken into account are energy inputs for preparing wastewater streams or washing liquids.

FIG. 1 illustrates a schematic of a plant for performing the method of the invention.

METHOD

The embodiment according to FIG. 1 provides that an essentially amorphous polycondensate prepolymer is continuously supplied to a heating and crystallization device (1), after which it is transferred to a reaction area (2).

Treatment in the crystallization device takes place using an at least partially circulated process gas, which is heated by means of a heater (H). Carrier gas streaming through the polycondensate in the reaction area is supplied to the process gas circulating in the crystallization system as an exchange gas. As a result, a quantity of process gas must be routed away form the crystallization circulation system and subsequently purified.

The contaminated process gas is routed through a gas scrubber (3) for purification with water as the washing liquid, subsequently dried in a dryer (4) and returned to the reactor without having been significantly heated.

In one variant, the process gas from the reactor and a portion of the process gas from the crystallization circulation system are mixed together. A portion of the mixed gas is purified, dried and sent back to the reactor.

Another portion of the mixed process gas is returned to the crystallization circulation system, either directly or after passing through the scrubber.

As an option, additional purification stages take place via the use of cyclones or filters.

The washing liquid is cooled and circulated in two closed systems via coolers (C1, C2). The overflow of contaminated washing liquid can be used in a special embodiment of the invention in a procedural step for preparing polycondensate waste, e.g., PET bottle scraps. If necessary, the pH value of the washing liquid can be adjusted, e.g., via neutralization. Other additives, e.g., surfactants, can be incorporated into the washing liquid.

An inert gas is used as the process gas. The inert gas is added in an amount sufficient to offset losses owing to the material supply line into the inert gas area and the material discharge line from the inert gas area, along with any other loss points. In order to minimize inert gas loss, material supply and material discharge take place by way of a transfer canal, in particular a cell wheel transfer canal.

As an option, transfer canals can also be situated between devices within the inert gas area or outside the inert gas area.

To ensure optimal space and energy utilization, the crystallization step is also to take place over the reaction step to enable product transfer via gravitation.

In another option, the polycondensate can be transferred by means of a conveyor, e.g., a pneumatic conveyor.

As an option, the reaction step can be followed by a cooling step (5), most preferably in air. Process gas from the cooling step can be used in an also optional heating step (6) taking place before the crystallization step.

Optionally used valves can be used to set or regulate the process gas quantity for the heating step.

Additional advantages, features and possible applications of the invention can be gleaned from the following description of examples according to the invention, not to be viewed as limiting, based on the drawing.

EXAMPLE 1

A regranulated polyethyleneterephthalate is supplied to a process according to FIG. 1 comprised of devices 1, 2, 3, 4, 5, 6, H, C1 and C2 at an inlet temperature of 10° C. The throughput measures 1 ton per hour.

In the crystallizer 1, the product is heated to 192° C., and the crystallinity is increased by 35%.

In reactor 2, the intrinsic viscosity is raised from 0.72 to 0.84.

9 tons per hour of nitrogen continuously heated to 202° C. are circulated in the circulating system for the crystallizer 1.

0.6 tons per hour of purified nitrogen continuously heated to 50° C. are supplied to the reactor 2.

Cooling takes place at 2.5 tons per hour of air. The nitrogen is purified by means of a 2-stage gas scrubber and adsorption dryer regenerated with heated process gas.

5 tons per hour or 1 ton per hour of washing liquid are circulated in the gas scrubber.

A respective transfer canal (not shown) is used before the crystallizer 1, before the reactor 2 and after the reactor 2.

A total of 44 kWh of energy for motors and 72 kWh of energy for heaters are supplied to the process, corresponding to an overall consumption of 116 kWh/ton.

Heat losses from the devices as well as product and process gas lines are here included. All devices are insulated to keep their surface temperature under 50° C.

EXAMPLE 2

In this example, the system from example 1 is expanded to include a product conveyor between the crystallizer 1 and the reactor 2. As a result, an additional 6 kWh are consumed as energy for conveying purposes and compensating for heat losses over the conveying path, corresponding to an overall consumption of 122 kWh/ton.

EXAMPLE 3

In this example, the system from example 2 is operated in such a way as to heat the product in the crystallizer 1 to 210° C., which increases the intrinsic viscosity to over 0.9. As a result, an additional 13 kWh are consumed as energy for heating purposes, corresponding to an overall consumption of 135 kWh/ton.

EXAMPLE 4

In this example, the system from example 1 is enhanced to include a heating device 6 before the crystallizer 1, through which 100% of the air flows out of the cooler, thereby increasing the product temperature at the inlet of the crystallizer 1 to 60° C. This increases the energy for motors to 47 kWh, and reduces the energy for heaters to 54 kWh, corresponding to an overall consumption of 101 kWh/ton.

The invention claimed is:

1. A method for manufacturing a high-molecular polyester out of a solidified polyester prepolymer via solid-phase polycondensation, wherein the polycondensation cleavage products from the solid-phase polycondensation reaction are removed from the product by means of a process gas, and the process gas is subsequently purified to remove the polycondensation cleavage products and essentially recycled, characterized in that the process gas is purified by means of an aqueous washing liquid.

2. The method according to claim 1, characterized in that the specific energy input at a throughput of between 10 and 60 tons per day measures less than 145 kWh/ton.

3. The method according to one of claims 1 and 2 characterized by at least one of the following features:
- The process is executed continuously;
- The polyester prepolymer is supplied to the process at an ambient temperature between 0 and 25° C.;
- The polyester prepolymer is supplied to the process essentially in an amorphous state at under 10% crystallinity;
- Crystallinity is increased by at least 20%;
- The product temperature is increased to at least 185° C.;
- The product temperature is increased by at least 160° C.;
- The polycondensate is raised to a higher level at least once during the process by means of a conveyor;
- The process gas is an inert gas. e.g., nitrogen or $CO_2$;
- The process gas purified with an aqueous washing liquid is subsequently dried.

4. The method according to any one of claims 1 or 2 characterized in that the polyester is selected from the group consisting of polyethyleneterephthalate (PET), polybutyleneterephthalate (PBT) and polyethylenenaphthalate (PEN) and a co-polymer thereof.

5. The method according to any one of claims 1 or 2 characterized in that the process gas quantity that is purified measures between 0.1 and 1.5 relative to the product quantity.

6. The method according to any one of claims 1 or 2 with at least one step for crystallization and at least one step for a solid-phase polycondensation reaction (SSP reaction), characterized in that each step has an allocated process gas stream.

7. The method according to claim 6, characterized in that the process gas streams are interconnected, and that the process gas is cleaned to remove volatile substances that pass from the product to the process gas in the crystallization circulation system.

8. The method according to claim 7 characterized in that additional steps are involved for at least one of product heating, product drying, crystallization, SSP reaction and product cooling.

9. The method according to any one of claims 1 and 2 with at least one step for heating the polyester, followed by at least one step for crystallization, at least one step for the solid-phase polycondensation reaction, and at least one step for cooling, wherein said step for heating and one of said other steps are accompanied by exposure to a process gas, characterized in that at least a portion of the process gas from said other step is used to heat up the polyester in the heating step prior to crystallization.

10. The method according to claim 9, characterized in that the process gas from said cooling step is used to heat the polyester in said heating step prior to crystallization.

11. The method according to claim 9 characterized in that a first crystallization step is preceded by a step for heating the polyester to a temperature Tv greater than 50° C.

12. The method according to claim 11 characterized in that said temperature Tv ranges from Tg−30° to Tg+30° C. wherein Tg denotes the glass transition temperature of the polyester as measured in the DSC.

13. The method according to claim 9 characterized in that the heating step takes place in a fixed-bed or fluidized-bed reactor.

14. The method according to claim 9 characterized in that the heating step is accompanied by a drying of the polycondensate to a moisture content of between 50 ppm water and 2000 ppm water.

15. The method according to claim 9 characterized in that the specific energy input measures less than 120 kWh/ton.

16. The method according to claim 1 further characterized in that entrained droplets are separated out of said process gas after purification thereof.

17. The method according to claim 1 further characterized in that said process gas is dried after purification thereof.

18. The method according to claim 1 further characterized in that oxygen is removed from said process gas after purification thereof.

19. The method according to claim 3 further characterized in that said product temperature is increased by at least 180° C.

20. The method according to claim 14 further characterized in that said heating step is accompanied by a drying of the polycondensate to a moisture content of between 200 ppm water and 1000 ppm water.

* * * * *